United States Patent [19]

Gierlach

[11] 3,845,725

[45] Nov. 5, 1974

[54] SNUBBED RAILWAY TRUCK

[75] Inventor: Robert W. Gierlach, Downers Grove, Ill.

[73] Assignee: Standard Car Truck Company, Chicago, Ill.

[22] Filed: May 4, 1973

[21] Appl. No.: 357,505

[52] U.S. Cl. ............... 105/197 DB, 105/197 CB, 105/197 R, 267/4, 308/138
[51] Int. Cl. .......... B61f 5/06, B61f 5/12, B61f 5/14
[58] Field of Search...... 105/197 D, 197 R, 199 CB, 105/197 DB; 267/4; 308/137, 138

[56] References Cited
UNITED STATES PATENTS

| | | | |
|---|---|---|---|
| 655,738 | 8/1900 | Robinson | 267/4 |
| 2,403,352 | 7/1946 | Edstrom | 105/197 D |
| 3,533,359 | 10/1970 | Williams | 105/199 CB |
| 3,556,504 | 1/1971 | Sinclair | 267/4 |
| 3,559,589 | 2/1971 | Williams | 105/197 DB |

*Primary Examiner*—M. Henson Wood, Jr.
*Assistant Examiner*—Howard Beltran
*Attorney, Agent, or Firm*—Kinzer, Plyer, Dorn & McEachran

[57] ABSTRACT

A railroad car bolster is supported on the snubbed bolster of a truck. Elastomeric cushions or pads are positioned between the two bolsters to provide resistance, in shear, to the pivotal movement between the truck and car bolsters. The opposite ends of the truck bolster are supported on side frames, there being a snubbed spring support between the side frames and the truck bolster. The spring support includes springs of varying deflection per pound of load with the result that the bolster is supported on springs having a greater deflection per pound of load when the car is empty and is supported on springs of less deflection per pound of load when the car is loaded. The combination of the springs of varying deflection and the elastomeric pads retard hunting of the car trucks about the pivotal attachment of the trucks to the car.

5 Claims, 2 Drawing Figures

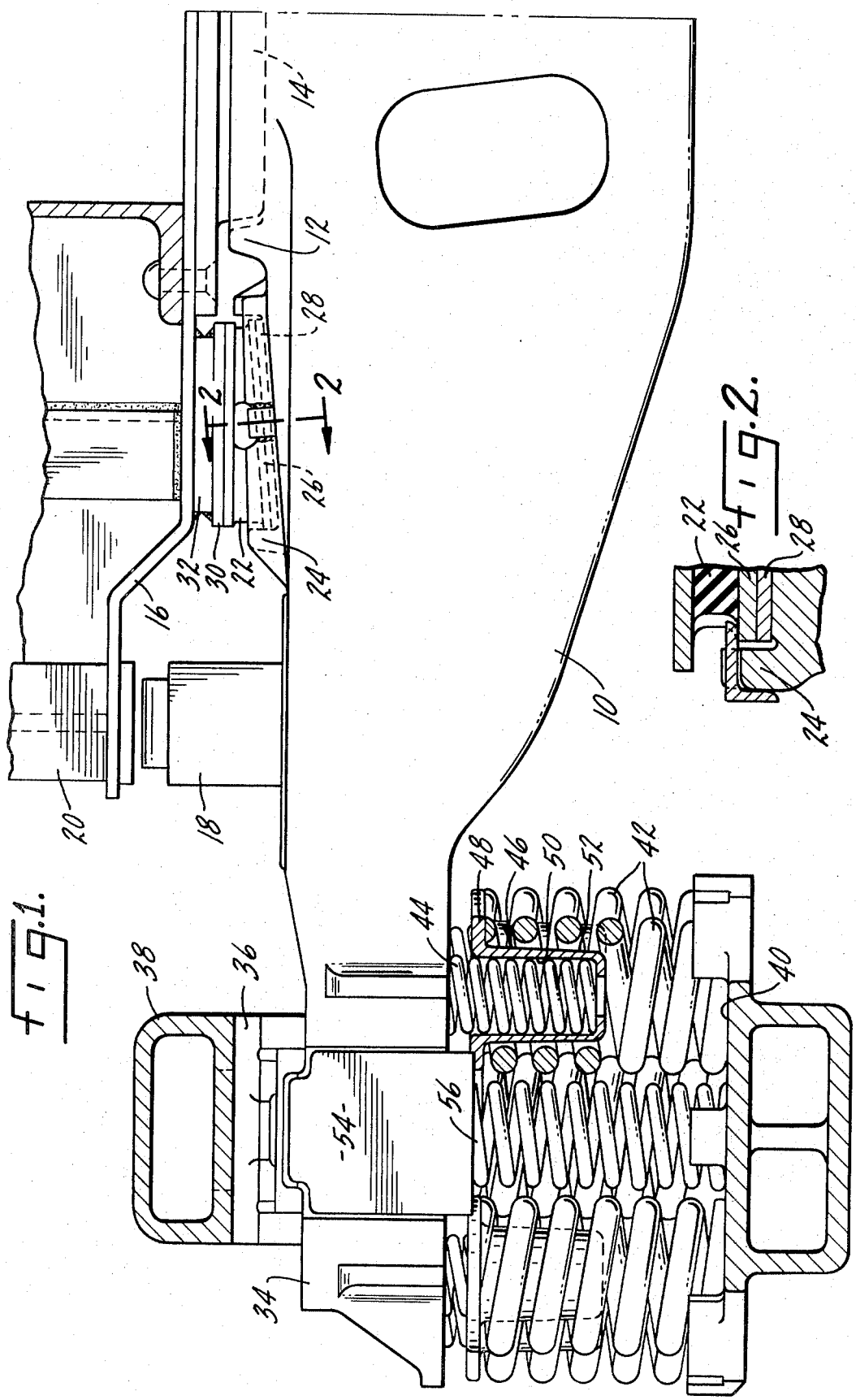

SNUBBED RAILWAY TRUCK

SUMMARY OF THE INVENTION

The present invention relates to improvements in railroad cars and particularly to a means for preventing hunting of the car trucks about the pivotal attachment of the trucks to the car frame.

One purpose of the present invention is a structure of the type described which supports the truck bolsters on springs having varying deflection rates.

Another purpose is a structure of the type described including elastomeric cushions positioned between the truck and car bolsters to retard pivotal movement therebetween.

Another purpose is a railroad car truck construction which prevents hunting of the car trucks through the combination of a spring support for the truck bolsters and cushions between the truck and car bolsters.

Other purposes will appear in the ensuing specification, drawings and claims.

BRIEF DESCRIPTION OF THE DRAWINGS

The invention is illustrated diagrammatically in the following drawings wherein:

FIG. 1 is a partial view of a railroad car truck and a portion of the car frame, FIG. 2 is an enlarged section along plane 2—2 of FIG. 1.

DESCRIPTION OF THE PREFERRED EMBODIMENT

The term "hunting" as applied to railroad cars is used to describe movement about the vertical axis of attachment of the car truck to the car body. Such hunting can have several damaging effects, particularly abnormal wear of the bolster centerplate, abnormal wear of the car wheels and at times such hunting can cause derailment.

Railway trucks have wheels, rigidly mounted on axles; one wheel near each end of an axle in such a way that both wheels revolve at the same rate. The wheel treads roll on the rails and are not cylindrical but are diammetrically larger at their inboard locations adjacent the wheel flanges than at portions further removed from the flanges The wheel treads taper toward the outboard side and while the taper is straight when new, wear changes the taper from a straight line to what is termed hollow tread, yet a diammetric difference still remains which influences hunting in much the same way.

Such an arrangement essentially provides a pair of cones rigidly mounted upon a common axle in a railway truck that will roll along a normal railway track in a straight path unless disturbed by external forces from the usual track irregularities, especially in the higher speed ranges.

The irregularities in normal track set the hunting phenomenon in motion only when train speeds are attained that are sufficient to cause rocking of the car body on its suspension system. The suspension system includes damping which tends to stabilize the supported car body up to a certain point.

Upon attaining the critical speed, rocking begins, which exerts lateral forces from side to side upon the trucks. These lateral forces may become sufficiently high to the point where they exceed the frictional resistance between the rolling wheel and the rail, thus forcing the wheels out of their natural path.

When this occurs, the wheel at one end of the axle travels faster than its mate, thereby turning the axle into an angular position and steering the truck toward the opposite side of the track where it then reverses the operation and hunting has begun and will continue so long as adequate speed is maintained.

It has been found that hunting is far more prevalent in empty cars than in loaded cars. There is seldom a hunting condition when cars are heavily loaded, but hunting can be quite severe when a car is traveling under no load or lightly loaded conditions.

The present invention thus is directed to the hunting problem and attacks it in several ways. First, by restraining rocking movement of the car by means of a redistribution of the load through an elastomeric pad at each side of the center plate and simultaneously restraining the pivotal movement of the truck by means of the shear characteristic of the pad. Second, by arranging the spring suspension system with the springs in series so that the empty or lightly loaded car is supported upon the "stacked" springs which provide sufficient deflection to lower the rocking frequency and thereby increase the speed range at which hunting will occur.

By means of these two devices the threshold of speed at which hunting occurs in railway trucks can be raised to a range beyond the limits at which freight trains ordinarily operate and thus prevent much of the objectionable wear of parts, especially center-plates and car wheels.

It has been found that the frequency of rocking directly affects the degree of hunting and that there is a lower rocking frequency where there is greater deflection of the springs supporting the bolster. Hence, by having relatively light springs supporting the car in an unloaded condition, spring deflection in light and unloaded conditions is substantially increased.

In FIG.1, a truck bolster is indicated at 10 and has a female centerplate 12 receiving a matching male centerplate 14 on the car bolster 16. Only half of the truck and car bolster is illustrated, but it should be understood that the opposite half will be identical in construction.

Extending upwardly from opposite sides of the truck bolster 10 are spacer members or side bearings 18 which are in alignment with stiffening supports 20 formed on the upper side of the car bolster 16. The side bearings are normally utilized to permit only a limited degree of rocking between the truck and the car frame.

Positioned inboard of the side bearing 18 is a cushion 22 positioned within a cushion pocket indicated generally at 24. The cushion may be similar to that shown in U.S. Pat. No. 3,533,359. The cushion 22 is preferably made of a rubberlike material or an elastomeric material and is positioned within the pocket on top of a wear plate 26 with the wear plate 26 in turn being supported on a shim 28 seated on the pocket floor. The upper side of the cushion 22 seats a wear plate 30 which in turn is welded to a support 32 extending downwardly from the bottom of the car bolster 16. In some applications the car bolster 16 may not have the irregular construction of FIG. 1 and may necessitate a differently formed spacer than that indicated at 32. What is important is to provide an elastomeric cushion and wear plates on opposite sides of it. The frictional resistance between the wear plates and the cushion tends to provide shear resistance to pivotal movement between the truck and car bolsters.

The outer end 34 of the bolster 10 passes through a window 36 in a side frame 38. The bolster end 34 is supported by spring means which seat upon the bottom surface 40 of the side frame 38. The springs supporting the bolster are formed into sets and there may be a plurality of such sets, for example seven such spring sets is common in many freight car construction. Each spring set includes a heavy duty spring 42 which is seated upon a side frame bottom surface 40 and a somewhat lighter spring 44 which supports the bottom of the car bolster 10. Each of the springs 44 is positioned within a cup 46 with each cup 46 having an outwardly-directed flange 48 which is seated upon the top of the heavy duty springs 42. The cups 46 may have a generally constant internal diameter, indicated at 50, and a varying outer diameter forming a tapering outer surface, indicated at 52. The tapered outer surface 52 is advantageous in accomodating the springs 42 when tilted during endwise movement of the bolster.

The springs 42, being made of substantially heavier material or heavier coils than the springs 44, will have less deflection per pound of load than the springs 44.

The structure is completed by a stabilizing snubbing means, for example similar to that shown in U.S. Pat. No. 3,559,589, which includes a wedge 54 supported on the spring 56 which in turn is seated upon the side frame bottom surface 40. The wedge 54 will be received within a wedge pocket formed in the bolster 10.

In use, the truck bolster 10 will be supported by the springs 44 when the car is in a light or unloaded condition. Thus, there will be greater deflection per pound of load than there would be if the bolster were supported only on the heavier springs 42. When the car is loaded, the springs 44 are compressed to the point where the bolster is seated directly on the flange 46 of the cup and springs 42 support the bolster and not the springs 44. As brought out above, the greater the deflection, the lower the frequency of rocking of the car about a horizontal axis and hence the less the hunting condition is aggravated.

It is the combination of the elastomeric cushion or pad which resists hunting, and the combination of the differential spring construction, tending to reduce rocking of the car which aggravates the hunting condition, which permits cars of the spring suspension construction shown herein to operate at higher speeds than cars without such a frame and bolster construction.

The hunting problem is attacked not only by the elastomeric pad construction, but also by the differential spring construction which tends to reduce any aggravation of the hunting condition caused by an empty car.

Whereas the preferred form of the invention has been shown and described herein, it should be realized that there may be many modifications, substitutions and alterations thereto.

The embodiments of the invention in which an enclusive property or privelege is claimed are defined as follows:

1. In combination in a railroad car, a car bolster and a truck supporting said bolster, said truck including a bolster pivotally attached to the car bolster, a pocket positioned on the upper side of the truck bolster on opposite sides of the pivotal attachment between the bolsters, each pocket having an elastomeric cushion, said cushions retarding relative pivotal movement between the car and truck bolsters, said truck having side frames and spring means supporting said bolster on said side frames, snubbing means dampering the action of said truck bolster with respect to said said side frames, said spring means including a plurality of first springs and a plurality of second springs, a cup positioned within each of said first springs, each cup having an outwardly-extending flange adjacent one end thereof for supporting each cup at the upper end of its respective first spring, each of said second springs being bottomed in its respective cup and extending upwardly in supportive contact with said bolster, each of said first springs having less deflection per pound of load than said second springs, whereby said bolster is supported by said first and second springs when the car is lightly loaded or unloaded and the bolster is supported by said first springs when heavily loaded.

2. The structure of claim 1 further characterized in that each said cup has a generally constant internal diameter and an outer surface which has a varying diameter.

3. The structure of claim 1 further characterized in that the car bolster has a pair of spacer members positioned on opposite sides of said pivotal attachment and generally in alignment with said elastomeric cushions.

4. The structure of claim 3 further characterized by and including a wear plate positioned on top of each cushion and bearing against each car bolster spacer.

5. The structure of claim 4 further characterized by and including a shim positioned beneath each elastomeric cushion and between the cushion and the truck bolster.

* * * * *